(12) United States Patent
Berthon et al.

(10) Patent No.: US 11,697,277 B2
(45) Date of Patent: Jul. 11, 2023

(54) HOT-STAMPING PRESS

(71) Applicant: KBA-NOTASYS SA, Lausanne (CH)

(72) Inventors: Aurélie Berthon, Villars-sous-Yens (CH); Ana Dimitrijevic, Lausanne (CH); Emmanuel Thony, Lausanne (CH)

(73) Assignee: KBA-NOTSYS SA, Lausanne (CH)

( * ) Notice: Subject to any disclaimer, the term of this patent is extended or adjusted under 35 U.S.C. 154(b) by 310 days.

(21) Appl. No.: 15/768,697

(22) PCT Filed: Nov. 29, 2016

(86) PCT No.: PCT/IB2016/057186
§ 371 (c)(1),
(2) Date: Apr. 16, 2018

(87) PCT Pub. No.: WO2017/093894
PCT Pub. Date: Jun. 8, 2017

(65) Prior Publication Data
US 2018/0264792 A1    Sep. 20, 2018

(30) Foreign Application Priority Data

Nov. 30, 2015    (EP) .................................... 15197154

(51) Int. Cl.
*B32B 37/00*    (2006.01)
*B32B 37/06*    (2006.01)
(Continued)

(52) U.S. Cl.
CPC ............ *B32B 37/025* (2013.01); *B32B 15/04* (2013.01); *B32B 27/00* (2013.01); *B32B 37/06* (2013.01);
(Continued)

(58) Field of Classification Search
USPC ........................................................ 156/275.5
See application file for complete search history.

(56) References Cited

U.S. PATENT DOCUMENTS

| 5,368,680 A | 11/1994 | Mitsam |
| 5,979,308 A | 11/1999 | Kägi et al. |

(Continued)

FOREIGN PATENT DOCUMENTS

| EP | 0 469 433 | 7/1991 |
| EP | 0 582 178 | 7/1993 |

(Continued)

OTHER PUBLICATIONS

Office Action issued in RU Appln. No. 2018112997/12 dated Mar. 7, 2019 (w/ partial translation).

(Continued)

*Primary Examiner* — Barbara J Musser
(74) *Attorney, Agent, or Firm* — Nixon & Vanderhye P.C.

(57) ABSTRACT

There is described a hot-stamping press (10; 10"; 10''') comprising a foil application unit (2; 2\*) designed to allow transfer or lamination of foil material (FM) by hot-stamping onto a substrate (S) supplied in the form of successive sheets or successive portions of a continuous web, which foil material (FM) is fed to the foil application unit (2; 2\*) in the form of a foil carrier (FC) supplied by means of a foil feeding system (3). The hot-stamping press (10; 10"; 10''') further comprises at least one UV-curing unit (61; 62; 63) located along a path (A) of the substrate (S) downstream of the foil application unit (2; 2\*) to subject the foil material (FM) transferred or laminated onto the substrate (S) to a UV-curing operation. The foil material (FM) is provided with an adhesive intended to ensure adhesion of the foil material (FM) onto the substrate (S), which adhesive comprises a combination of hot-melt compounds reacting to the application of heat produced by the foil application unit (2;

(Continued)

2*) and UV-curing compounds reacting to the application of ultraviolet radiation produced by the UV-curing unit (61; 62; 63).

12 Claims, 10 Drawing Sheets

(51) Int. Cl.
  *B32B 27/00*    (2006.01)
  *B32B 15/04*    (2006.01)
  *B32B 37/08*    (2006.01)
  *B32B 37/10*    (2006.01)
  *B32B 37/12*    (2006.01)

(52) U.S. Cl.
  CPC ............. *B32B 37/08* (2013.01); *B32B 37/10* (2013.01); *B32B 37/1207* (2013.01); *B32B 37/0046* (2013.01); *B32B 2037/1215* (2013.01); *B32B 2037/1253* (2013.01); *B32B 2310/0831* (2013.01)

(56) References Cited

U.S. PATENT DOCUMENTS

| | | | |
|---|---|---|---|
| 6,112,651 | A | 9/2000 | Eitel et al. |
| 6,451,152 | B1 * | 9/2002 | Holmes ................ B23K 26/034 156/173 |
| 7,424,903 | B2 | 9/2008 | Kagi et al. |
| 7,922,858 | B2 * | 4/2011 | Eitel .................... B32B 38/0004 156/257 |
| 7,971,619 | B2 | 7/2011 | Eitel et al. |
| 8,316,764 | B1 | 11/2012 | Wu |
| 8,628,187 | B2 | 1/2014 | Roof et al. |
| 10,350,910 | B2 * | 7/2019 | Miwa ..................... B41J 11/002 |
| 2006/0194024 | A1 * | 8/2006 | Nakayama ................ B32B 3/14 428/195.1 |
| 2007/0181260 | A1 | 8/2007 | Mitsam et al. |
| 2008/0314512 | A1 * | 12/2008 | Bartsch ............... B32B 37/1284 156/258 |
| 2010/0148428 | A1 | 6/2010 | Kägi et al. |
| 2011/0174884 | A1 * | 7/2011 | Endres .................. B42D 25/47 235/488 |
| 2011/0265671 | A1 | 11/2011 | Brendle |
| 2012/0314012 | A1 * | 12/2012 | Roof ..................... B41J 11/002 347/102 |
| 2015/0151528 | A1 | 6/2015 | Shimizu et al. |
| 2015/0314580 | A1 | 11/2015 | Sato et al. |

FOREIGN PATENT DOCUMENTS

| | | |
|---|---|---|
| EP | 0 858 888 A2 | 8/1998 |
| EP | 1 593 503 A | 11/2005 |
| EP | 2 204 355 | 7/2010 |
| EP | 2 962 835 | 1/2016 |
| EP | 3 165 365 | 5/2017 |
| EP | 3 165 366 | 5/2017 |
| GB | 2 368 313 | 5/2002 |
| JP | 04-226737 | 8/1992 |
| JP | 06-166168 | 6/1994 |
| JP | 07-247043 | 9/1995 |
| JP | 2005-059340 | 3/2005 |
| JP | 2007-533506 | 11/2007 |
| JP | 2008-502560 | 1/2008 |
| JP | 2010-521319 | 6/2010 |
| JP | 2015-528754 | 10/2015 |
| KR | 2012-0028270 | 3/2012 |
| RU | 2 329 540 | 7/2008 |
| RU | 2 412 057 | 2/2011 |
| WO | WO 94/13487 | 6/1994 |
| WO | WO 97/35721 | 10/1997 |
| WO | WO 97/35794 | 10/1997 |
| WO | WO 97/35795 | 10/1997 |
| WO | WO 97/36756 | 10/1997 |
| WO | WO 03/043823 | 5/2003 |
| WO | 2005/102733 | 11/2005 |
| WO | WO 2005/102733 | 11/2005 |
| WO | 2005/120832 | 12/2005 |
| WO | WO 2005/120832 | 12/2005 |
| WO | 2006/005434 | 1/2006 |
| WO | 2008/028309 A1 | 3/2008 |
| WO | 2008/104904 | 9/2008 |
| WO | WO 2008/104904 | 9/2008 |
| WO | WO 2009/112989 | 9/2009 |
| WO | 2009/143644 A1 | 12/2009 |
| WO | WO 2010/001317 | 1/2010 |
| WO | WO 2013/190048 | 12/2013 |
| WO | WO 2014/132764 | 9/2014 |

OTHER PUBLICATIONS

Sina Ebnesajjad, Characteristics of Adhesive Materials, 2011, pp. 137-183.

International Search Report and Written Opinion of the ISA for PCT/IB2016/057186, dated Mar. 28, 2017, 12 pages.

* cited by examiner

HOT-STAMPING PRESS

This application is the U.S. national phase of International Application No. PCT/IB2016/057186 filed 29 Nov. 2016, which designated the U.S. and claims priority to EP Patent Application No. 15197154.6 filed 30 Nov. 2015, the entire contents of each of which are hereby incorporated by reference.

TECHNICAL FIELD

The present invention generally relates to a hot-stamping press. More precisely, the present invention relates to a hot-stamping press comprising a foil application unit designed to allow transfer or lamination of foil material by hot-stamping onto a substrate supplied in the form of successive sheets or successive portions of a continuous web, which foil material is fed to the foil application unit in the form of a foil carrier supplied by means of a foil feeding system. The present invention also relates to a process of transferring or laminating foil material by hot-stamping onto a substrate supplied in the form of successive sheets or successive portions of a continuous web. The present invention is in particular applicable for the production of security documents, such as banknotes.

BACKGROUND OF THE INVENTION

Hot-stamping presses that are adapted to carry out hot-stamping of foil material are known in the art, for instance from International (PCT) Publications Nos. WO 97/35721 A1, WO 97/35794 A1, WO 97/35795 A1, WO 97/36756 A1, WO 03/043823 A1, WO 2005/102733 A2 and WO 2008/104904 A1, which publications are incorporated herein by reference in their entirety.

Figure 1:
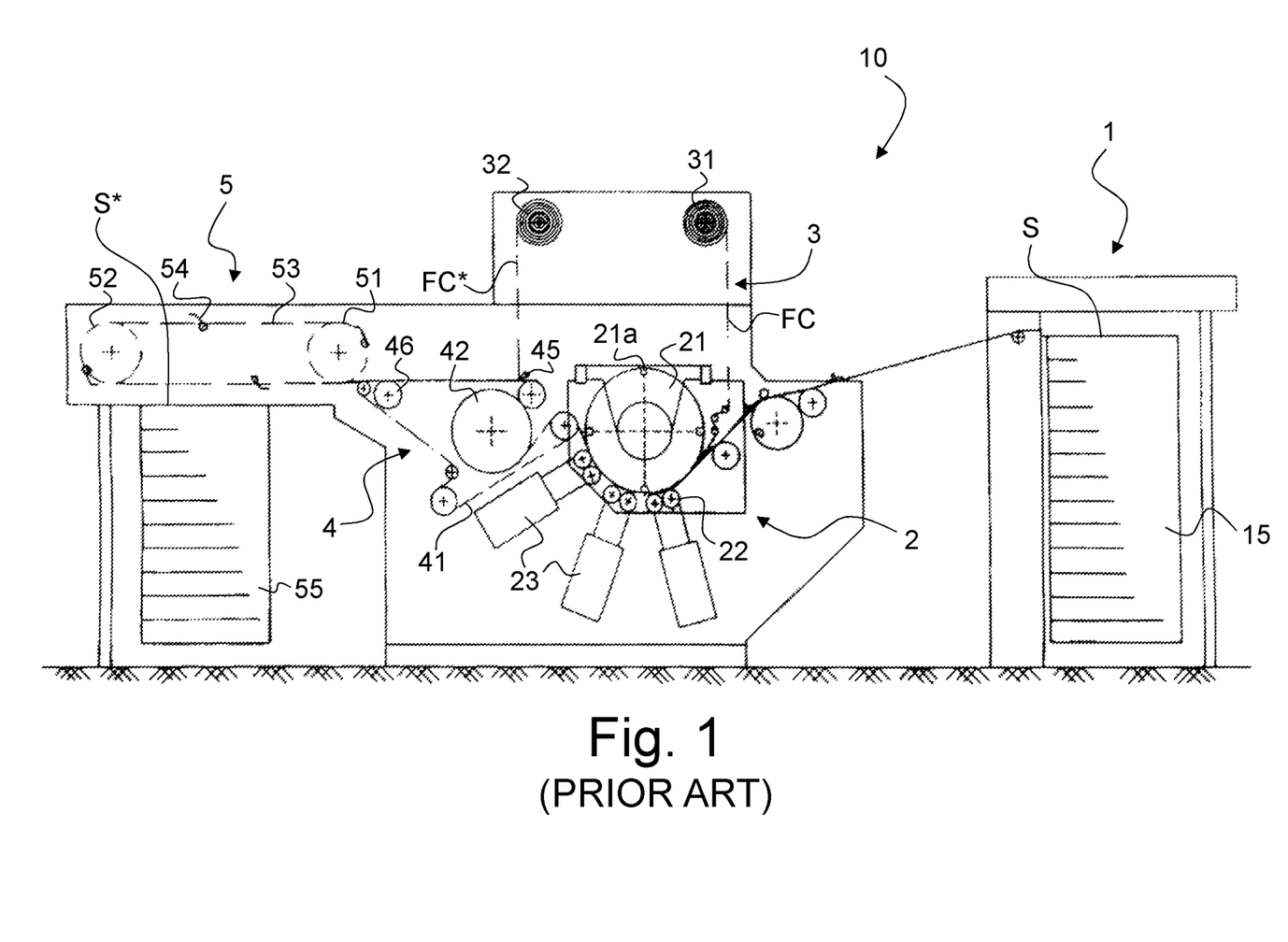
FIG. 1 is a schematic side view of a known hot-stamping press.

FIG. 1 is an illustration of a known sheet-fed hot-stamping press, designated globally by reference numeral 10, as discussed in the aforementioned publications. This hot-stamping press 10 is designed for performing hot-stamping of foil material onto successive sheets S which are fed from a sheet feeder 1 supplying individual sheets S in succession from a sheet feeding pile 15 for processing in a downstream-located foil application unit 2. This foil application unit 2 is designed in the present illustration to allow transfer by hot-stamping of foil material onto the successive sheets S, which foil material is conventionally fed to the foil application unit 2 in the form of a continuous band by means of a foil feeding system 3. More precisely, the foil material to be transferred onto the sheets S is provided on a suitable foil carrier FC, which is brought into contact with the surface of the sheets S so as to allow transfer of the foil material from the foil carrier FC onto the sheets S under the combined application of heat and pressure.

Alternatively, the foil application unit 2 could be adapted to allow lamination of foil material as for instance disclosed in International (PCT) Publication No. WO 2008/104904 A1 (see also International (PCT) Publications Nos. WO 2009/112989 A1 and WO 2010/001317 A1, which are likewise incorporated herein by reference in their entirety). In this case, at least a part of the foil carrier FC is laminated onto the sheets S as part of the applied foil material.

The foil application unit 2 comprises a heated stamping cylinder 21 with at least one, usually multiple circumferential stamping sections 210 (see FIG. 2) that are provided on a circumference of the stamping cylinder 21. In the illustrated example, one will appreciate that the stamping cylinder 21 actually comprises a plurality of (namely six) circumferential stamping sections 210 that are provided on the circumference of the stamping cylinder and distributed axially along an axis of rotation of the stamping cylinder 21 (i.e. along direction x in FIG. 2) at a plurality of axial positions, which axial positions correspond to different columns of security imprints that are present on the sheets S. Each circumferential stamping section 210 actually comprises successive stamping segments 211 that are distributed one after the other about the circumference of the stamping cylinder 21 (i.e. along the circumferential direction y in FIG. 2). In the illustrated example, the stamping cylinder 21 is a four-segment cylinder and each stamping section 210 accordingly comprises four such stamping segments 211, which are conventionally designed as individual stamping segments that are secured at both ends in corresponding cylinder pits 21b as discussed in greater detail in International (PCT) Publication No. WO 2005/102733 A2.

Figure 2:
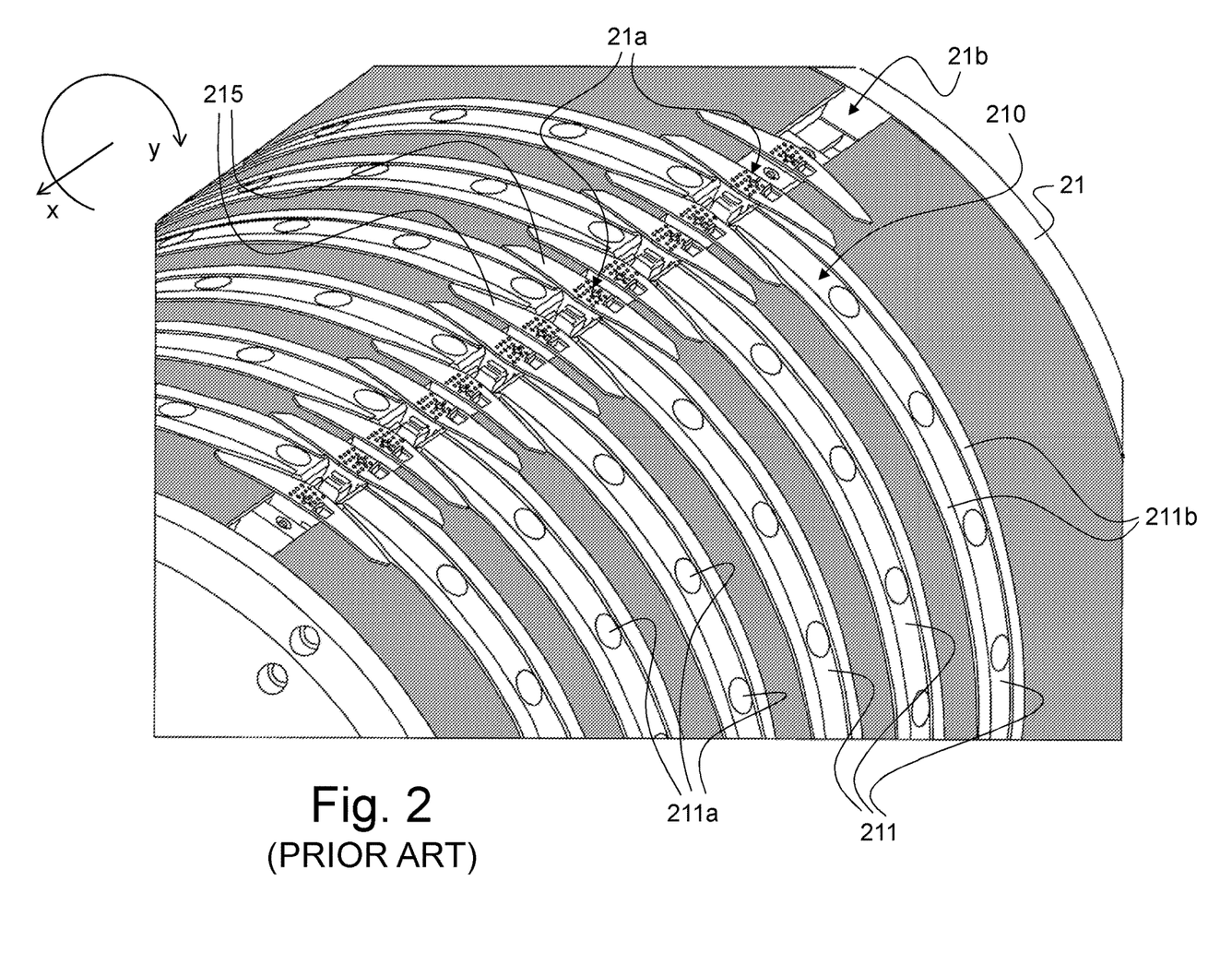
FIG. 2 is a partial perspective view of a known stamping cylinder as used in the hot-stamping press of FIG. 1.

As shown in FIGS. 1 and 2, four sets of sheet holding units 21a are distributed about the circumference of the stamping cylinder 21 in order to hold a leading edge of each successive sheet S that is fed to the stamping cylinder 21. These sheet holding units 21a can in particular be configured as suction units that are designed to hold the leading edge of a sheet S by suction. In the illustrated example, the sheet holding units 21a are integrated into a number of bridge elements 215 that are provided and secured in the cylinder pits 21b as illustrated in FIG. 2 and discussed in greater detail in International (PCT) Publication No. WO 2005/102733 A2.

The foil carrier FC is typically fed to the foil application unit 2 by means of the foil feeding system 3 that comprises one or more supply rolls 31 for the supply of the foil carrier FC and one or more winding-up rolls 32 for winding up used foil carrier, designated by reference numeral FC*. The particular structure of the foil feeding system 3 is not of major relevance in the context of the instant invention. It suffices to understand that the foil feeding system 3 is adapted to supply the foil carrier FC in register with the sheets S. More detailed information regarding the structure and operation of the foil feeding system 3 can be found for instance in International (PCT) Publication No. WO 94/13487 A1, which is incorporated herein by reference in its entirety.

In the aforementioned hot-stamping press, it will be understood that the foil carrier FC is fed from the foil feeding system 3 to the stamping cylinder 21 between the circumferential stamping sections 210 and the sheets S that are fed from the sheet feeder 1.

As illustrated in FIG. 1, multiple counter-pressure rollers 22 are provided about a portion of the circumference of the stamping cylinder 21. More precisely, the counter-pressure rollers 22 are arranged in pairs and distributed about a lower portion of the circumference of the stamping cylinder 21 so as to press the underside of the sheet S against the circumference of the stamping cylinder 21 and thereby ensure application of a suitable pressure between the foil carrier FC and the sheet S to cause transfer of the foil material from its carrier FC onto the sheet S. This transfer is also ensured through the application of heat applied via the stamping cylinder 21 that is heated up to a suitable temperature. The pairs of counter-pressure rollers 22 are typically constructed as individual counter-pressure unit each comprising its own pneumatic (or hydraulic) cylinder or piston 23 designed to press the counter-pressure rollers 22 against the circumference of the stamping cylinder 21, or more exactly against the circumference of the circumferential stamping sections 210. European Patent Publication No. EP 0 582 178 A1 and International (PCT) Publication No. WO 2005/120832 A1, which are incorporated herein by reference in their entirety, disclose further details of counter-pressure roller systems for hot-stamping presses.

In the aforementioned context, as illustrated in FIG. 2, each stamping segment 211 of the circumferential stamping sections 210 typically comprises corresponding stamping surface(s) 211a, which come into contact with the foil carrier FC, as well as supporting tracks 211b located on either side of the stamping surface(s) 211a, which come into contact with the sheets S, outside of the region where the foil carrier FC is present, so as to provide continuous support for the counter-pressure rollers 22. As shown in FIG. 2, the supporting tracks 211b are aligned with the bridge elements 215 so as to provide uninterrupted support for the counter-pressure rollers 22 across the region of the cylinder pits 21b. In the illustration of FIG. 2, each stamping segment 211 includes a plurality of individual stamping surfaces 211a, which is typical for the application of individual patches of foil material onto the sheets S. In the event of a stripe application, each stamping segment 211 would typically include a single, continuous stamping surface 211a to cause transfer of a corresponding continuous stripe of foil material onto the sheets S.

Downstream of the foil application unit 2, there is typically provided a conveyor system 4 for conveying the sheets S and foil carrier FC, which is still attached to the sheets S, away from the stamping cylinder 21. This conveyor system 4 conventionally comprises conveyor belts or bands 41 and a cooling roller 42 about the circumference of which the sheets S and foil carrier FC are brought in order to cool-down the sheets S and foil carrier FC and thereby enhance adhesion of the foil material onto the sheets S prior to separation of the foil carrier FC. A foil detachment device 45 is also typically provided along the path of the conveyor system 4 so as to separate the foil carrier FC from the sheets S. The used foil carrier FC* is then wound up around the winding-up roll(s) 32 or possibly fed again upstream of the foil application unit 2 (which is typically done in case of patch application—see again International (PCT) Publication No. WO 94/13487 A1).

At a downstream end of the conveyor system 4, there is typically provided a suction drum 46 that works in conjunction with a downstream-located chain-gripper system to transport and deliver the processed sheets, designated by reference numeral S* for the sake of distinction, in a sheet delivery unit 5 of the hot-stamping press 10. More precisely, the chain-gripper system consists of chain wheels 51, 52 driving a pair of endless chains 53 extending therebetween and holding spaced-apart gripper bars 54 designed to hold the processed sheets S* by a leading edge thereof and transport the processed sheets S* individually in order to be delivered on top of a sheet delivery pile 55. More than one delivery pile 55 may be provided.

Figure 3:
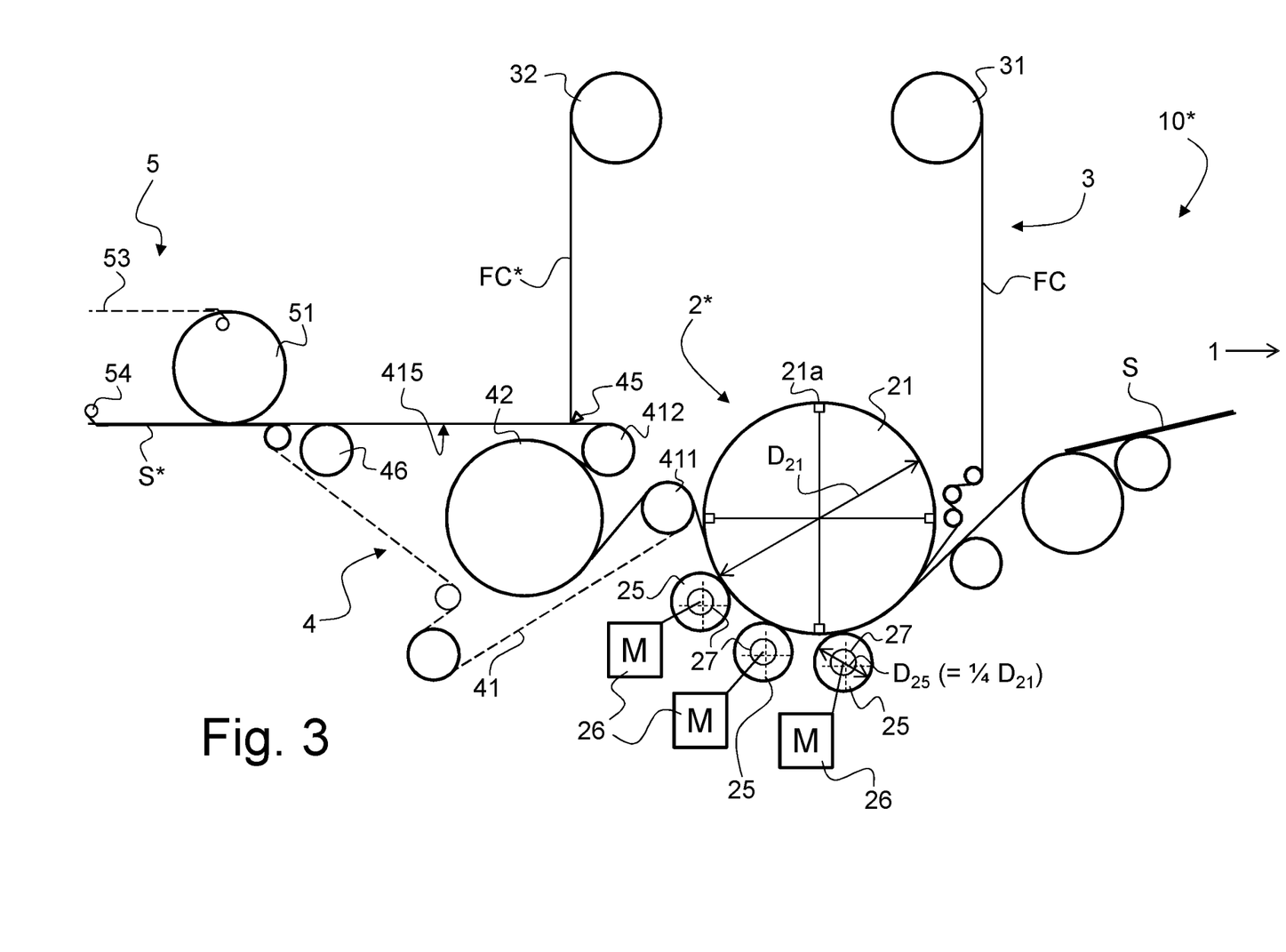
FIG. 3 is a schematic side view of a hot-stamping press in accordance with the disclosure of European Patent Applications Nos. 15193276.1 and 15193279.5 of Nov. 5, 2015.

An alternative to the use of the counter-pressure rollers 22 shown in FIG. 1 may advantageously consist in the use of individual cylinder units acting as counter-pressure units, which cylinder units are provided with a plurality of circumferential pressing elements that are positioned to cooperate with the circumferential stamping sections 210 of the stamping cylinder 21 and are preferably driven into rotation by means of at least one dedicated drive. Such a solution is in particular disclosed in European Patent Applications Nos. 15193276.1 and 15193279.5 of Nov. 5, 2015 entitled "SHEET-FED STAMPING PRESS" filed in the name of the present Applicant. Such a solution is schematically illustrated in FIG. 3.

A challenge in the context of the aforementioned hot-stamping presses is to ensure proper adhesion of the foil material onto the relevant substrates, and there is a persistent need to improve the known hot-stamping presses in that respect.

SUMMARY OF THE INVENTION

A general aim of the invention is therefore to improve the known hot-stamping presses and hot-stamping processes.

More precisely, an aim of the present invention is to provide such a hot-stamping press and process which allow to improve foil adhesion onto the processed substrates.

These aims are achieved thanks to the hot-stamping press and process defined in the claims.

There is accordingly provided a hot-stamping press comprising a foil application unit designed to allow transfer or lamination of foil material by hot-stamping onto a substrate supplied in the form of successive sheets or successive portions of a continuous web, which foil material is fed to the foil application unit in the form of a foil carrier supplied by means of a foil feeding system. According to the invention, the hot-stamping press further comprises at least one UV-curing unit located along a path of the substrate downstream of the foil application unit to subject the foil material transferred or laminated onto the substrate to a UV-curing operation. In this context, the foil material is provided with an adhesive intended to ensure adhesion of the foil material onto the substrate, which adhesive comprises a combination of hot-melt compounds reacting to the application of heat produced by the foil application unit and UV-curing compounds reacting to the application of ultraviolet radiation produced by the UV-curing unit.

In accordance with a preferred embodiment of the invention, the hot-stamping press further comprises a foil detachment device located downstream of the foil application unit to separate at least part of the foil carrier from the substrate, and the UV-curing unit is provided upstream of the foil detachment device. In accordance with an alternate embodiment, the UV-curing unit is provided downstream of the foil detachment device.

Advantageously, the hot-stamping press further comprises a cooling unit located downstream of the foil application unit to cool down the foil material and the adhesive subsequent to the application of the foil material onto the substrate, and the UV-curing unit is provided downstream of the cooling unit.

Alternatively, the UV-curing unit can be located immediately after the foil application unit.

In accordance with a particularly advantageous and preferred embodiment of the invention, the UV-curing unit is a UV-LED curing unit.

In accordance with another variant of the invention, the foil feeding system is adapted to supply the foil carrier at a plurality of transverse positions transversely to the path of the substrate and the UV-curing unit comprises a plurality of UV-curing heads (e.g. UV-LED curing heads) that are distributed transversely to the path of the substrate, each UV-curing head being located at a corresponding one of the transverse positions along which the foil material is applied onto the substrate. In this context, a position of the UV-curing heads transversely to the path of the substrate is advantageously adjustable. Furthermore, each UV-curing head is preferably designed to focus ultraviolet radiation along a longitudinal section of the path of the foil material past the UV-curing unit.

In accordance with yet another variant of the invention, the foil feeding system is adapted to supply the foil carrier at a plurality of transverse positions transversely to the path of the substrate and the UV-LED curing unit comprises a transverse bar extending transversely to the path of the substrate, which transverse bar includes a plurality of individually-addressable LED elements or individually-addressable clusters of LED elements, which LED elements or clusters of LED elements are activated in dependence of the transverse positions along which the foil material is applied onto the substrate.

The UV-curing unit can be located along a curved portion of the path of the substrate (in which case the UV-curing unit is preferably designed to cooperate with a cylinder or roller supporting the substrate past the UV-curing unit) or along a substantially flat portion of the path of the substrate (in which case the UV-curing unit is preferably designed to cooperate with a flat surface supporting the substrate past the UV-curing unit).

There is also provided a process of transferring or laminating foil material by hot-stamping onto a substrate supplied in the form of successive sheets or successive portions of a continuous web, which foil material is fed in the form of a foil carrier, the process comprising the steps of (i) providing the foil material with an adhesive intended to ensure adhesion of the foil material onto the substrate, which adhesive comprises a combination of hot-melt compounds reacting to the application of heat and UV-curing compounds reacting to the application of ultraviolet radiation, (ii) transferring or laminating the foil material by hot-stamping onto the substrate, which hot-stamping operation involves subjecting the hot-melt compounds of the adhesive to heat, and (iii) subsequently subjecting the foil material transferred or laminated onto the substrate to a UV-curing operation, which UV-curing operation involves subjecting the UV-curing compounds of the adhesive to ultraviolet radiation.

Preferably, the process further comprises the step of separating at least part of the foil carrier from the substrate after the hot-stamping operation, the UV-curing operation being carried out before separating the at least part of the foil carrier from the substrate.

Likewise preferably, the process further comprises the step of cooling down the foil material and the adhesive after the hot-stamping operation, the UV-curing operation being carried out after cooling down the foil material and the adhesive.

Further advantageous embodiments of the invention are discussed below.

BRIEF DESCRIPTION OF THE DRAWINGS

Other features and advantages of the present invention will appear more clearly from reading the following detailed description of embodiments of the invention which are presented solely by way of non-restrictive examples and illustrated by the attached drawings in which.

DETAILED DESCRIPTION OF EMBODIMENTS OF THE INVENTION

Figure 8:
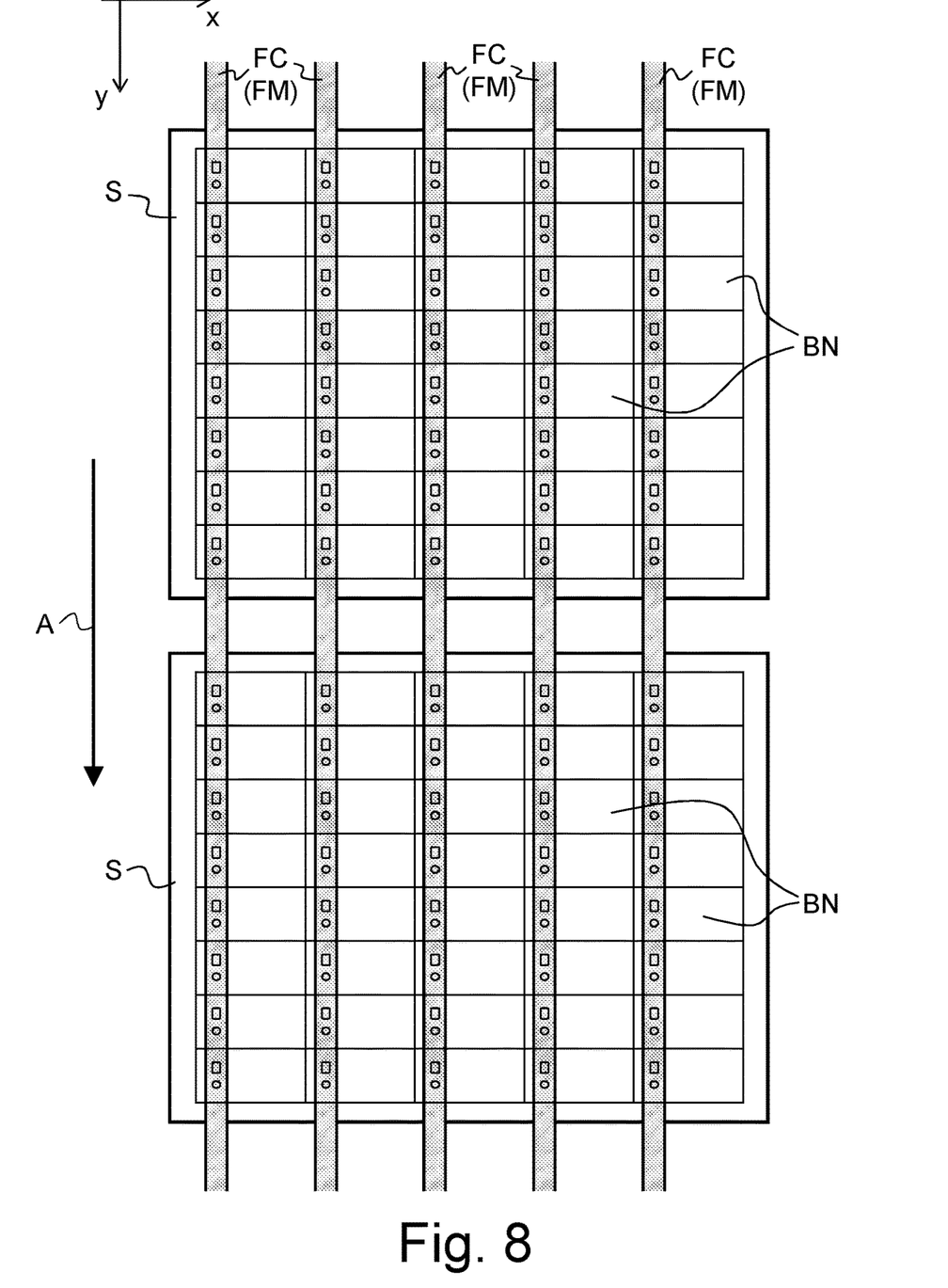
FIG. 8 is a schematic illustration of the application of foil material on two successive sheets.

The present invention will be described in the particular context of a sheet-fed hot-stamping press for the production of security documents, such as banknotes. In this context, the sheets are typically provided with a matrix arrangement of multiple security imprints printed on the sheets (see e.g. FIG. 8 where such security imprints are designated by reference BN). It should be understood however that the present invention is generally applicable to process substrates supplied in the form of successive sheets or successive portions of a continuous web. The substrate can be any suitable type of substrate, including but not limited to paper or cotton-based substrates, polymer substrates, and hybrid or composite substrates as typically used in the production of security documents.

FIG. 3 is a schematic diagram of a sheet-fed hot-stamping press 10* in accordance with the disclosure of European Patent Applications Nos. 15193276.1 and 15193279.5 of Nov. 5, 2015. Relevant subgroups of the hot-stamping press 10* are basically identical to corresponding subgroups of the hot-stamping press 10 shown in FIG. 1, namely the sheet feeder 1, the foil feeding system 3, the conveyor system 4 and the delivery unit 5. Components of the hot-stamping press 10* of FIG. 3 that are designated by the same reference numerals as in FIG. 1 will not be described again, it being to be appreciated that some of these components are not directly impacting the invention. In particular, the construction of the conveyor system 4 and delivery unit 5 shown schematically in FIG. 3 does not directly affect the invention and other solutions could be contemplated in order to ensure transfer of the sheets S and foil carrier FC away from the stamping cylinder 21 of the hot-stamping press 10*.

The hot-stamping press 10* of FIG. 3 is in particular characterized in that it comprises a foil application unit, designated by reference numeral 2*, including a stamping cylinder 21 that is basically similar to the stamping cylinder 21 of FIG. 1. This stamping cylinder 21 is likewise provided with at least one circumferential stamping section 210 (not specifically shown in FIG. 3) provided on a circumference of the stamping cylinder 21 and comprising successive stamping segments 211* or 211 (shown schematically in FIGS. 4a and 4b) distributed one after the other about the circumference of the stamping cylinder 21. Like in the prior art example of FIGS. 1 and 2, the stamping cylinder 21 is a four-segment cylinder and acts as sheet-transporting cylinder. The stamping cylinder 21 therefore likewise comprises multiple sheet holding units 21a distributed about the circumference of the stamping cylinder 21 and designed to hold the successive sheets S against the circumference of the stamping cylinder 21**.

A main difference resides in the structure and operation of the counter-pressure system that cooperates with the stamping cylinder 21 and is used to exert pressure on the sheets S. In the illustration of FIG. 3, multiple counter-pressure units 25 (namely three in the illustrated example) are distributed about a portion of the circumference of the stamping cylinder 21. These counter-pressure units 25 are designed to press the successive sheets S and the foil carrier FC against the outer surface of the stamping segments **211*/211**. In contrast to the solution of FIG. 1, each counter-pressure unit 25 is designed as a cylinder unit that is provided with at least one circumferential pressing element—namely as many circumferential pressing elements as there are circumferential stamping sections 210—positioned to cooperate with the circumferential stamping section 210 of the stamping cylinder 21. The circumferential pressing elements of each counter-pressure unit 25** are preferably designed as pressing rings that are supported on a common shaft (not shown).

The particular structure of the circumferential pressing elements acting as counter-pressure units 25 in FIG. 3 will not be described in detail here. It suffices to understand that, in the event that the stamping cylinder 21 comprises a plurality of circumferential stamping sections 210 provided on the circumference of the stamping cylinder 21, which circumferential stamping sections 210 are distributed axially along an axis of rotation of the stamping cylinder 21 at a plurality of axial positions, each counter-pressure unit 25 is likewise provided with a plurality of circumferential pressing elements that are distributed axially along an axis of rotation of the cylinder unit at a plurality of axial positions corresponding to the axial positions of the circumferential stamping sections 210 of the stamping cylinder 21. In such a situation, the foil feeding system 3 is adapted to feed multiple foil carriers FC at a plurality of axial positions (see e.g. FIG. 8) corresponding to the axial positions of the circumferential stamping sections 210.

The counter-pressure units 25 are advantageously driven into rotation by means of at least one dedicated drive. This can be a common drive driving all counter-pressure units 25 or, preferably, as schematically illustrated in FIG. 3, separate drives 26, such as servo-motors, each driving a corresponding one of the counter-pressure units 25. Preferably, a rotational speed or angular position of each counter-pressure unit 25 is adjustable with respect to a rotational speed or angular position of the stamping cylinder 21. This helps adjusting operation of the counter-pressure units 25 to improve transport of the sheets S and ensure optimal transfer of the foil material from the foil carrier FC onto the sheets S. This also allows adequate repositioning—if need be—of the individual counter-pressure units 25 from one stamping segment **211*/211*** to the next.

Figure 4A:
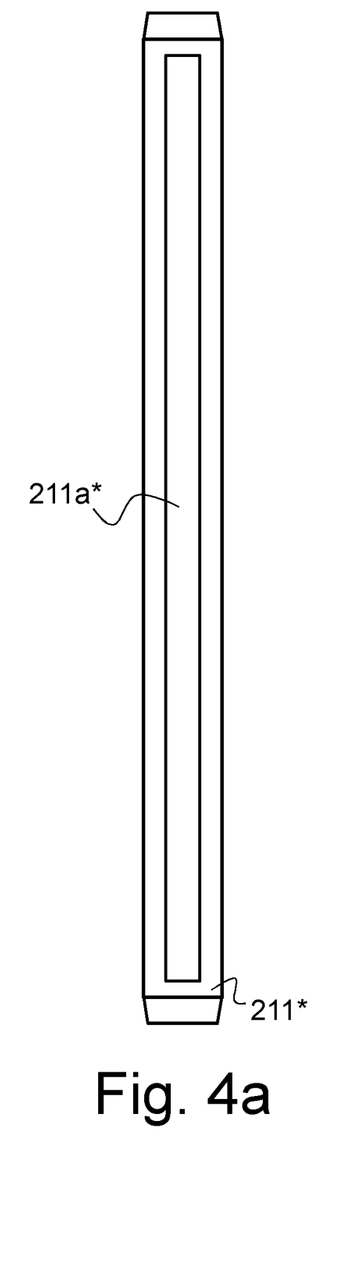
FIG. 4a is a schematic view of a stamping segment suitable for stripe application of foil material in the context of the hot-stamping press of FIG. 3.
Figure 4B:
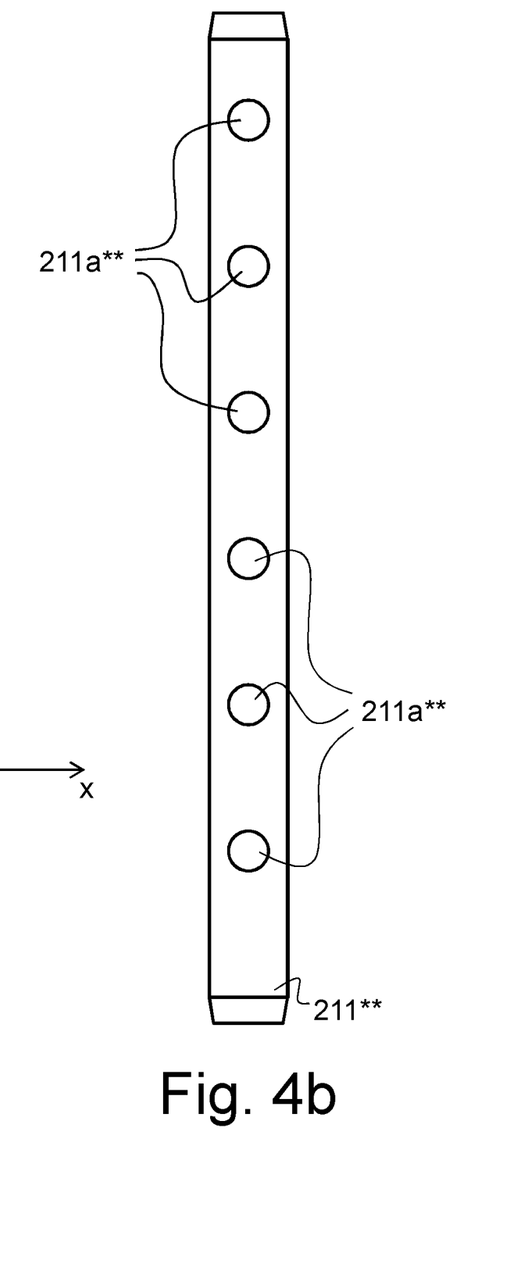
FIG. 4b is a schematic view of a stamping segment suitable for patch application of foil material in the context of the hot-stamping press of FIG. 3.

As shown in FIGS. 4*a* and 4*b*, each stamping segment **211*/211** comprises one or more stamping surfaces 211*a*/211*a** coming into contact with corresponding portions of the foil carrier FC corresponding to the foil material to be transferred onto the sheets S. FIG. 4***a* shows a structure of a stamping segment 211* used for stripe application. In this case, the stamping segment 211* comprises a continuous stamping surface 211*a** designed to allow application of a continuous stripe of foil material onto the successive sheets S. FIG. 4***b* shows a structure of a stamping segment 211 used for patch application. In this other example, the stamping segment 211*a comprises one or more individual stamping surfaces 211*a designed to allow application of one or more corresponding portions (or patches) of foil material onto the successive sheets S. In the illustrated example, six individual stamping surfaces 211*a are provided, which would be convenient for patch application onto sheets S carrying six rows of security imprints. It will understood that the number and position of the relevant stamping surfaces depends on the particular layout of the sheets S to be processed (another non-limiting example of a possible layout being shown for instance in FIG. 8**).

Preferably, a distance of each counter-pressure unit 25 with respect to the circumference of the stamping cylinder 21 is adjustable. That is, each counter-pressure unit 25 is not pressed against the circumference of the stamping cylinder 21 under the action of any pneumatic or hydraulic system as in solution of FIG. 1, but a position of each counter-pressure unit 25 per se with respect to the circumference of the stamping cylinder 21 is adjusted. In other words, the resulting pressure exerted by each counter-pressure unit 25 is dependent on the actual position of the cylinder unit with respect to the stamping cylinder 21 and the combined thickness of the sheets S and foil carrier FC that are interposed between the counter-pressure unit 25 and the stamping cylinder 21. Such adjustment of the distance of the counter-pressure unit 25 with respect to the circumference of the stamping cylinder 21 is preferably achieved through mounting of each counter-pressure unit on suitable eccentric bearings that are schematically illustrated and designated in FIG. 3 by reference numeral 27.

An adjustment in position of the counter-pressure units 25 with respect to the circumference of the stamping cylinder 21 is especially advantageous in that it does not require the provision of supporting tracks (like the supporting tracks 211*b* shown in FIG. 2) on the stamping segments **211*/211**, as illustrated in FIGS. 4***a* and 4*b*. Indeed, a continuous support of the cylinder unit against the circumference of the stamping cylinder 21 (or more precisely against the circumference of the circumferential stamping sections 210) is not anymore required in such a case. This is of substantial interest, as the contact surface with the sheets S is considerably reduced, and therefore the friction that comes with it, which helps reducing or even preventing undesired movement or slippage of the sheets S during application of the foil material and furthermore suppresses undesired interactions with the surface of the sheets S on both sides outside of the region where the foil material is applied onto the sheets S.

Furthermore, a ratio of a nominal diameter $D_{21}$ of each circumferential stamping section 210 of the stamping cylinder 21 over a nominal diameter $D_{25}$ of each circumferential pressing element of the counter-pressure units 25 is preferably and advantageously an integer multiple. In the illustrated example this ratio $D_{21}/D_{25}$ is equal to 4. This is particularly advantageous in that there is a one-to-one relationship between the circumference of the circumferential pressing element(s) and each segment of the stamping cylinder 21, i.e. each point of the circumference of the circumferential pressing element(s) always corresponds to a same point on the surface of the sheets (assuming that the stamping cylinder 21 and counter-pressure unit 25 are rotated in synchronism or repositioned at the start of each stamping segment **211*/211****). There is therefore no risk that any undesired transfer of residues from the sheets S (such as ink residues) on the surface of the circumferential pressing element(s) is transferred back onto a different location of the sheets S, which could otherwise cause undesired quality defects on the sheets S.

Further refinements of the hot-stamping press of FIG. 3 are discussed in the aforementioned European Patent Applications Nos. 15193276.1 and 15193279.5 of Nov. 5, 2015, which are incorporated herein by reference.

It is to be understood that the present invention is applicable in the context of the hot-stamping press of FIG. 3, of FIG. 1 or any other suitable hot-stamping press. The drawings of FIGS. 1 and 3 (and of FIGS. 5 to 7 that will now be discussed) are therefore to be understood as being purely illustrative.

In the context of the present invention, it should be understood that the foil material FM (namely the side thereof that is intended to be brought into contact with the surface of the substrate S) is provided with an adhesive intended to ensure adhesion of the foil material FM onto the substrate S, which adhesive comprises a combination of hot-melt compounds reacting to the application of heat produced by the foil application unit 2, resp. 2*, and UV-curing compounds reacting to the application of ultraviolet radiation produced by at least one UV-curing unit that is located along a path of the substrate S (indicated by arrow bearing reference A in FIGS. 8 to 10) downstream of the foil application unit 2, 2*.

This adhesive can be provided onto the foil material FM in the form of a mixture of the aforementioned compounds and/or in the form of one or more layers of adhesive. The actual composition of the adhesive may be different depending on the type of foil material FM and the type of substrate S being processed. Suitable adhesives are in particular available from company BASF.

Figure 5:
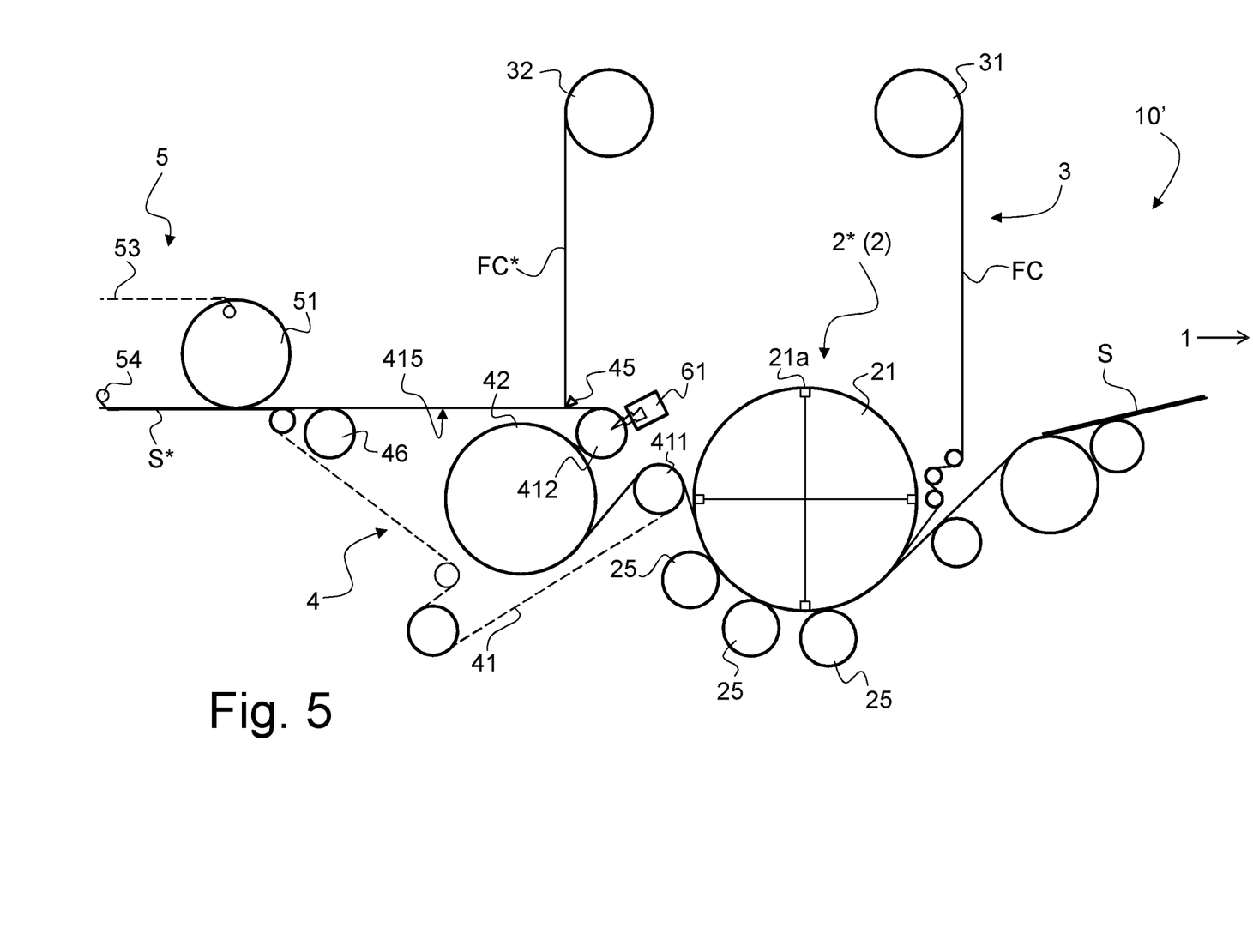
FIG. 5 is a schematic side view of a hot-stamping press in accordance with a first embodiment of the invention.

FIG. 5 is a schematic side view of a hot-stamping press, designated by reference numeral 10' for the sake of distinction, in accordance with a first embodiment of the invention. The hot-stamping press 10' of FIG. 5 shares the same basic configuration as the previously-described hot-stamping press 10* shown in FIG. 3. As already mentioned, the concept illustrated in FIG. 5 is however equally applicable to any other suitable hot-stamping press, including but not limited to the hot-stamping press of FIG. 1. Other hot-stamping press configurations could be contemplated without departing from the scope of the annexed claims. For instance, the hot-stamping press may exhibit a flat configuration of the type discussed for instance in European Patent Publications Nos. EP 0 858 888 A2, EP 1 593 503 A2, EP 2 059 468 A1 and EP 2 285 720 A1.

In accordance with this first embodiment, the hot-stamping press 10' advantageously comprises at least one UV-curing unit, designated by reference numeral 61, that is located downstream of the cooling unit 42 and upstream of the foil detachment device 45, to subject the foil material FM transferred or laminated onto the substrate S to a UV-curing operation. In this particularly preferred example, the UV-curing operation is performed at a particularly convenient time, namely after cooling down of the foil material FM and the adhesive and before separation of the foil carrier FC from the substrate S. This is an ideal location from the point of view of the cooling operation and the foil separation operation.

In the illustration of FIG. 5, the UV-curing unit 61 is located along a curved portion of the path of the substrate S, namely in the vicinity of a conveyor roller/cylinder 412 of the conveyor system 4 that is located immediately after the cooling unit 42. The UV-curing unit 61 could alternatively be located along a substantially flat portion of the path of the substrate S, namely in the vicinity of the flat surface 415 of the table (not specifically shown) that supports the conveyor belts/bands 41 of the conveyor system 4 at an output portion thereof. In that respect, the UV-curing unit 61 could be located in a manner similar to the UV-curing unit 62 of FIG. 6 with the difference that it would be located upstream of the foil detachment device 45.

Figure 6:
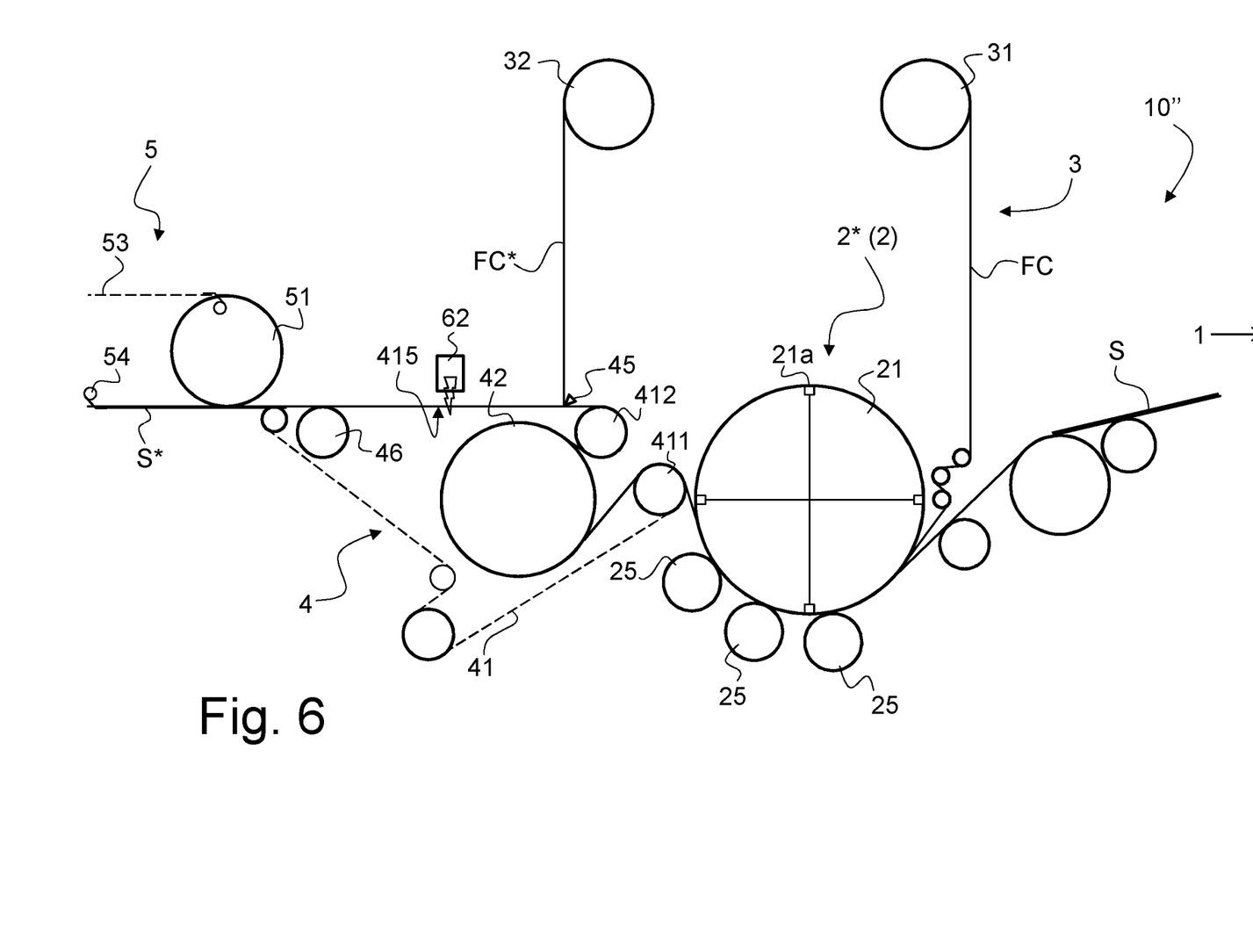
FIG. 6 is a schematic side view of a hot-stamping press in accordance with a second embodiment of the invention.

FIG. 6 is a schematic side view of a hot-stamping press, designated by reference numeral 10" for the sake of distinction, in accordance with a second embodiment of the invention. The hot-stamping press 10" of FIG. 6 likewise shares the same basic configuration as the previously-described hot-stamping presses 10* and 10' shown in FIGS. 3 and 5. In contrast to the first embodiment of FIG. 5, the at least one UV-curing unit, designated here by reference numeral 62, is located downstream of the foil detachment device 45 (and of the cooling unit 42) to subject the foil material FM transferred or laminated onto the substrate S to a UV-curing operation. In this other example, the UV-curing operation is therefore performed only after separation of the foil carrier FC from the substrate S.

In the illustration of FIG. 6, the UV-curing unit 62 is located along a substantially flat portion of the path of the substrate S, namely in the vicinity of the flat surface 415 of the table that supports the conveyor belts/bands 41 of the conveyor system 4 at its output portion.

Figure 7:
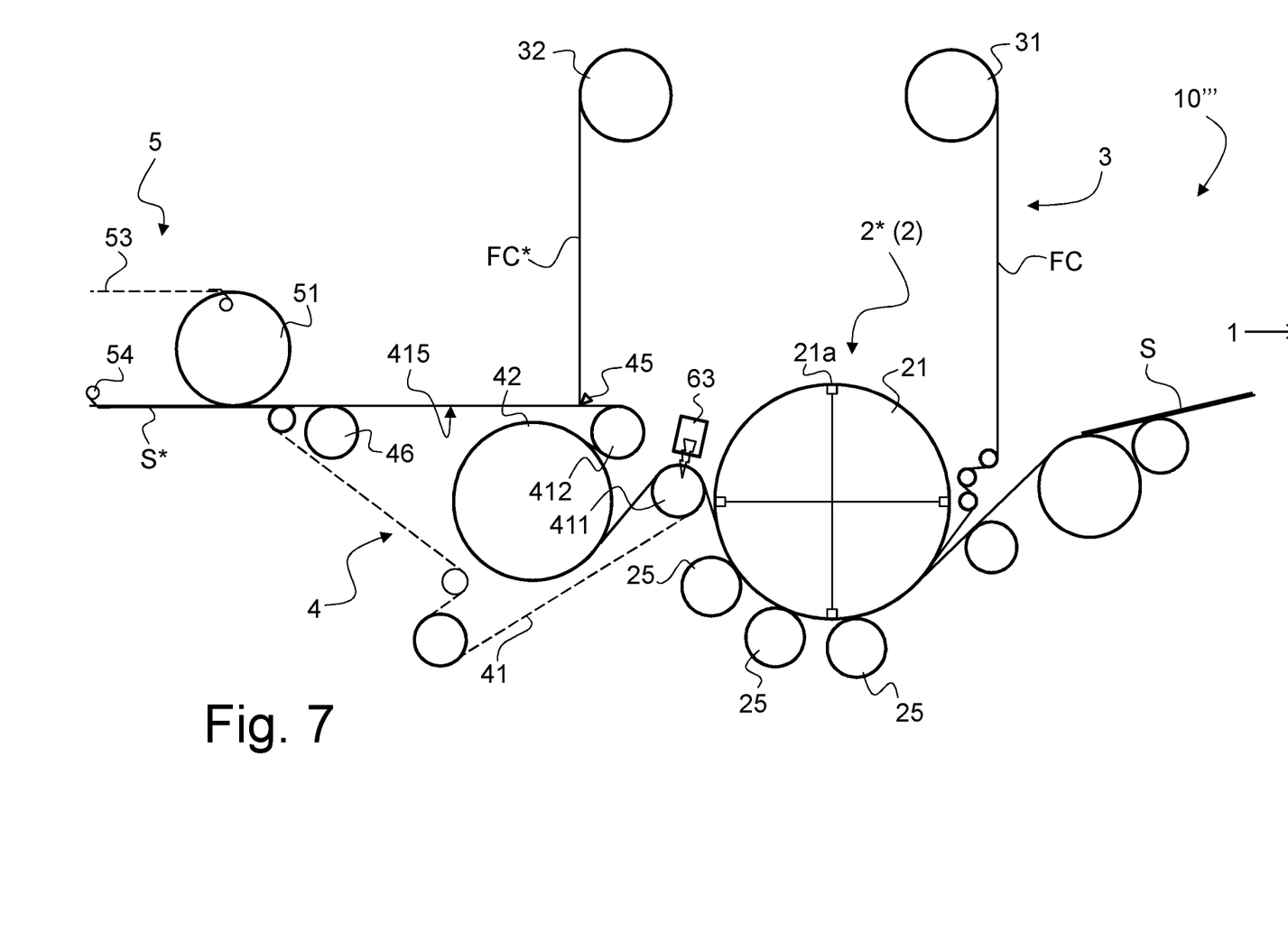
FIG. 7 is a schematic side view of a hot-stamping press in accordance with a third embodiment of the invention.

FIG. 7 is a schematic side view of a hot-stamping press, designated by reference numeral 10''' for the sake of distinction, in accordance with a third embodiment of the invention. The hot-stamping press 10''' of FIG. 7 once again shares the same basic configuration as the previously-described hot-stamping presses 10*, 10' and 10" shown in FIGS. 3, 5 and 6. In contrast to the first and second embodiments of FIGS. 5 and 6, the at least one UV-curing unit, designated here by reference numeral 63, is located immediately after the foil application unit 2* (2) (i.e. upstream of the cooling unit 42) to subject the foil material FM transferred or laminated onto the substrate S to a UV-curing operation. In this other example, the UV-curing operation is therefore performed immediately after the hot-stamping operation.

In the illustration of FIG. 7, the UV-curing unit 63 is located along a curved portion of the path of the substrate S, namely in the vicinity of a conveyor roller/cylinder 411 of the conveyor system 4 that is located immediately after the foil application unit 2* (2).

It should be appreciated that combinations of the embodiments of FIGS. 5, 6 and/or 7 are possible in the context of the present invention. Furthermore, more than one UV-curing unit could be located along the path of the substrate S downstream of the foil application unit 2/2* to subject the foil material FM transferred or laminated onto the substrate S to a UV-curing operation.

In the context of the present invention, each UV-curing unit 61, 62, 63 is preferably a UV-LED curing unit, i.e. a UV-curing unit based on UV-LED technology. UV-LED technology provides greater flexibility in terms of the integration of the UV-curing unit in the hot-stamping press (especially in view of the typically less-stringent cooling requirements) as well as increased freedom in the operation of the UV-curing unit. For instance, the UV-curing unit can be selectively activated or deactivated depending on the relevant portion of the foil material FM and substrate S being processed, such as between two successive sheets, as in the illustration of FIG. 8, where no UV-curing operation is necessary.

Figure 9A:
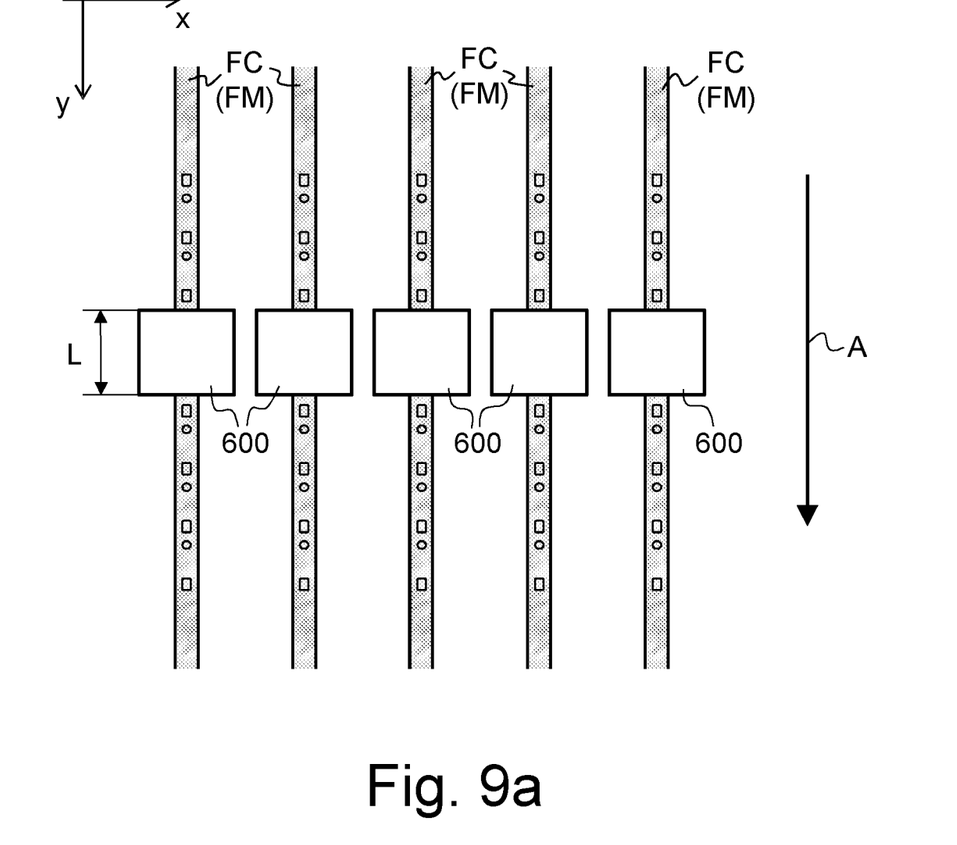
FIGS. 9a and 9b are schematic illustrations of a first example of a UV curing unit that can advantageously be contemplated in the context of the present invention.

Furthermore, in the context of a particular application where the foil feeding system 3 of the hot-stamping press of the invention is adapted to supply the foil carrier FC at a plurality of transverse positions transversely to the path A of the substrate S (as schematically shown in the non-limiting illustration of FIG. 8), the UV-curing unit preferably comprises a plurality of UV-curing heads 600 (as shown in FIG. 9a) that are distributed transversely to the path A of the substrate S, each UV-curing head 600 being located at a corresponding one of the transverse positions along which the foil carrier FC/foil material FM is applied onto the substrate S. In the illustration of FIG. 9a, five such UV-curing heads 600 are provided. It is once again to be understood that the actual number of UV-curing heads 600 is dependent on the layout of the relevant substrates to be processed, namely the number of columns of security imprints BN that are provided onto the substrates S.

In that respect, a position of each UV-curing head 600 transversely to the path A of the substrate S is advantageously adjustable, which can be achieved e.g. by mounting the individual UV-curing heads 600 onto a suitable guiding rail extending transversely to the path A of the substrates.

Figure 9B:
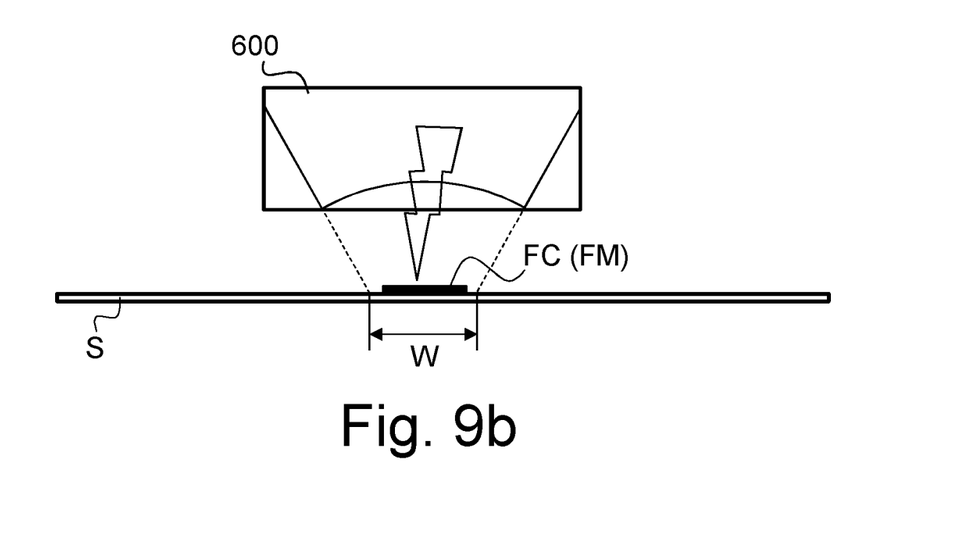

In addition, in accordance with an advantageous refinement of the invention as shown in FIG. 9b, each UV-curing head 600 is preferably designed to focus ultraviolet radiation along a longitudinal section (designated by reference L in FIG. 9a) of the path A of the foil carrier FC/foil material FM past the UV-curing unit. In that context, it is particularly advantageous to design the relevant UV-curing heads 600 so as to focus the ultraviolet radiation on a surface exhibiting a width W (transversely to the path A of the substrate S) sufficient to cover the width of the relevant foil material FM being processed.

Figure 10:
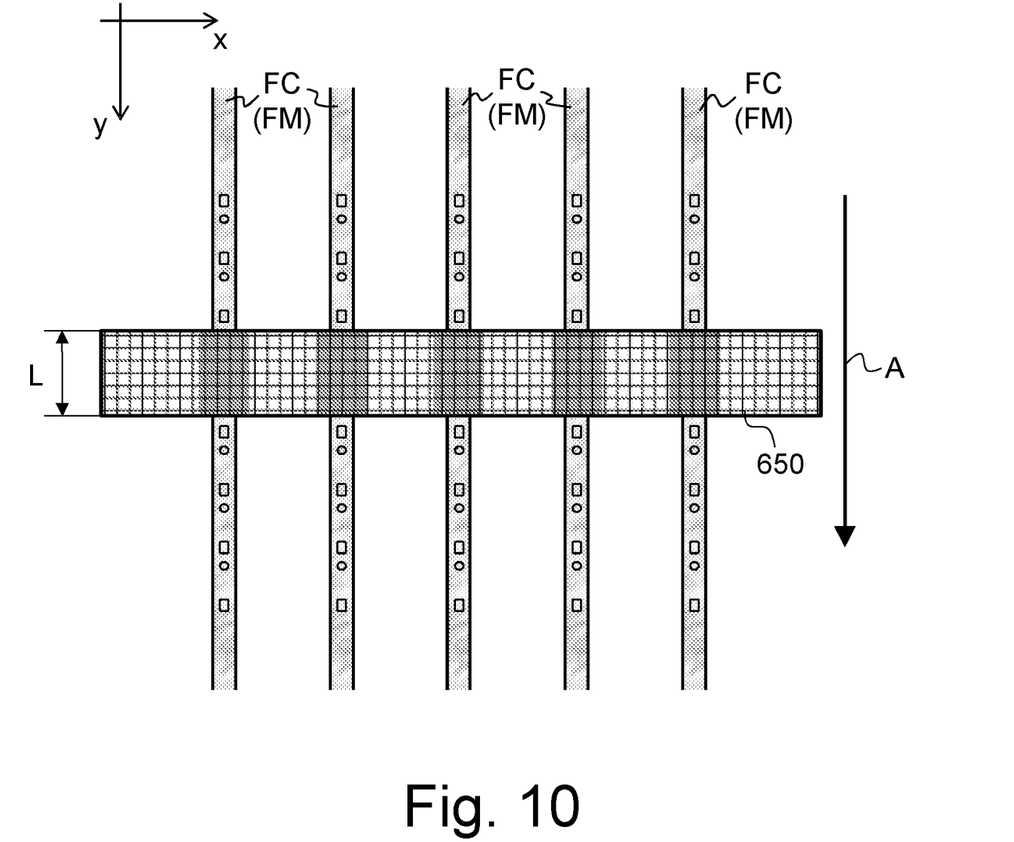
FIG. 10 is a schematic illustration of a second example of a UV curing unit that can advantageously be contemplated in the context of the present invention.

In accordance with a variant of the UV-curing unit configuration shown schematically in FIG. 10, one can alternatively contemplate to use a UV-LED curing unit comprising a transverse bar, designated by reference numeral 650, extending transversely to the path A of the substrate S, which transverse bar 650 includes a plurality of individually-addressable LED elements or individually-addressable clusters of LED elements, which LED elements or clusters of LED elements are activated in dependence of the transverse positions along which the foil material FM is applied onto the substrate S as schematically illustrated by the darker areas in FIG. 10.

In this context, the use of individually-addressable LED elements or clusters of LED elements allows great flexibility in the adaptation of the UV-curing unit to the particular layout of the substrate and the relevant positions of the foil carrier FC/foil material FM.

Various modifications and/or improvements may be made to the above-described embodiments. In particular, as already mentioned, the invention is applicable to any suitable hot-stamping press configuration. Furthermore, the invention is generally applicable to the transfer or lamination of foil material by hot-stamping onto a substrate supplied in the form of successive sheets or successive portions of a continuous web.

Furthermore, the invention is applicable irrespective of the type of substrate being processed, be it for instance paper or cotton-based substrates, polymer substrates, hybrid or composite substrates, and the like.

LIST OF REFERENCE NUMERALS USED THEREIN 10 (sheet-fed) hot-stamping press (prior art—FIG. 1)
10* (sheet-fed) hot-stamping press (FIG. 3)
10' (sheet-fed) hot-stamping press (first embodiment of the invention—FIG. 5)
10" (sheet-fed) hot-stamping press (first embodiment of the invention—FIG. 6)
10''' (sheet-fed) hot-stamping press (first embodiment of the invention—FIG. 7)
1 sheet feeder
15 sheet feeding pile
S substrate(s) (e.g. successive sheets or successive portions of a continuous web)
S* substrate(s) with foil material FM applied thereupon (processed substrate)
BN individual security imprints (e.g. banknote imprints) provided on substrate S
2 foil application unit (prior art—FIG. 1)
2* foil application unit (alternative of FIG. 3)
FC foil carrier carrying or forming the foil material to be applied onto the sheets S (e.g. hot-stamping foil)
FC* used foil carrier
FM foil material transferred on substrate S from foil carrier FC or laminated on substrate S as part of the foil carrier FC
21 stamping cylinder (e.g. four-segment cylinder)
21a sheet holding units distributed about the circumference of the stamping cylinder 21 to hold successive sheets S on the stamping cylinder 21
21b cylinder pits where sheet holding units 21a are located
210 circumferential stamping sections provided on circumference of stamping cylinder 21 and extending in the circumferential direction y/multiple circumferential stamping sections are distributed axially along an axis of rotation (transverse direction x) of the stamping cylinder 21 at a plurality of axial positions
$D_{21}$ nominal diameter of stamping cylinder 21, i.e. of circumferential stamping sections 210
211 plurality of (e.g. four) successive stamping segments distributed one after the other about the circumference of the stamping cylinder 21 and jointly forming a circumferential stamping section 210 (prior art—FIGS. 1 and 2)
211a stamping surface(s) of stamping segments 211 (which come into contact with the foil carrier FC)
211b supporting tracks of stamping segments 211 (which come into contact with the sheets S and provide continuous support for the counter-pressure rollers 22
215 bridge elements provided in cylinders pits 21b to ensure continuous support for the counter-pressure rollers from one stamping segment 211 to the next (prior art—FIGS. 1 and 2)
211* stamping segment forming part of a circumferential stamping section 210 (used in the context of the example of FIG. 3—see FIG. 4a)
211a* continuous stamping surface of stamping segment 211* (for stripe application)
211** stamping segment forming part of a circumferential stamping section 210 (used in the context of the example of FIG. 3—see FIG. 4b)
211a individual stamping surfaces of stamping segment 211 (for patch application)
22 counter-pressure rollers (prior art—FIG. 1)
23 pneumatic cylinders designed to press the counter-pressure rollers 22 against the circumference of the stamping cylinder 21 (prior art—FIG. 1)
25 counter-pressure units/cylinder units (FIG. 3 and FIGS. 5 to 7)
$D_{25}$ nominal diameter of counter-pressure units 25, i.e. of circumferential pressing elements thereof (with $D_{21}/D_{25}$ being an integer multiple)
26 drive (e.g. servo motors) used to drive counter-pressure units 25 into rotation (FIG. 3)
27 eccentric bearings of counter-pressure units 25 (FIG. 3)
3 foil feeding system 31 supply roll for the supply of a foil carrier FC
32 winding-up roll for winding up used foil carrier FC*
4 conveyor system for conveying sheets S and foil carrier FC away from the stamping cylinder 21
41 conveyor belts/bands
42 cooling unit (e.g. cooling roller)
45 foil detachment device
46 suction drum
411 conveying roller/cylinder of conveyor system 4 located immediately after the foil application unit 2/2*
412 conveying roller/cylinder of conveyor system 4 located immediately after the cooling unit 42
415 supporting surface (e.g. table) located at an output portion of the conveyor system 4
5 sheet delivery unit
51, 52 chain wheels
53 endless chains extending between chain wheels 51, 52
54 spaced-apart gripper bars driven by endless chains 53
55 sheet delivery pile
61 UV-curing unit, e.g. UV-LED curing unit (embodiment of FIG. 5)
62 UV-curing unit, e.g. UV-LED curing unit (embodiment of FIG. 6)
63 UV-curing unit, e.g. UV-LED curing unit (embodiment of FIG. 7)
600 individual UV-curing heads (e.g. UV-LED curing heads) forming UV-curing unit 61, 62 or 63 (embodiment of FIGS. 9a-b)
650 transverse bar forming UV-curing unit 61, 62 or 63 and comprising individually-addressable LED elements or individually-addressable clusters of LED elements (embodiment of FIG. 10)
x transverse/axial direction (parallel to axes of rotation of stamping cylinder 21 and counter-pressure units 25)
y circumferential direction (sheet transport direction parallel to path A)
A path of the substrate S/of the foil carrier FC/of the foil material FM
L longitudinal section of the path A of the foil carrier FC/of the foil material FM that is subjected to the UV-curing operation (from a few centimetres to several centimetres in length)
W width (transversely to path A) of the surface of the substrate S and of the foil carrier FC/of the foil material FM that is subjected to the UV-curing operation (see e.g. FIG. 9b)

The invention claimed is:

1. A hot-stamping press comprising:
a foil material;
an adhesive provided on the foil material;
a sheet or a continuous web, the sheet being bank notes or security documents, the continuous web being bank notes or security documents;
a foil application unit designed to allow transfer or lamination of the foil material by hot-stamping onto the sheet or continuous web supplied in the form of successive sheets or successive portions of the continuous web, the foil application unit being configured to receive the foil material in the form of a foil carrier supplied by way of a foil feeding system;
a foil detachment device located downstream of the foil application unit to separate at least part of the foil carrier from the sheet or continuous web; and
at least one UV-curing unit located along a path of the sheet or continuous web downstream of the foil application unit to subject the foil material transferred or laminated onto the sheet or continuous web to a UV-curing operation, the at least one UV-curing unit being provided upstream or downstream of the foil detachment device,
wherein the adhesive is provided on the foil material in a manner that allows the sheet or continuous web to come into contact with the adhesive upon the foil material being applied to the sheet or continuous web,
wherein the adhesive is configured to ensure adhesion of the foil material onto the sheet or continuous web, the adhesive comprising a combination of hot-melt compounds configured to react to the application of heat produced by the foil application unit and UV-curing compounds configured to react to the application of ultraviolet radiation produced by the UV-curing unit,
wherein the foil feeding system is adapted to supply the foil carrier at a plurality of transverse positions transversely to the path of the sheet or continuous web and wherein the UV-curing unit comprises a plurality of UV-curing heads that are distributed transversely to the path of the sheet or continuous web, each UV-curing head being located at a corresponding one of the transverse positions along which the foil material is applied onto the sheet or continuous web, and
wherein each of the UV-curing heads are individually movable transversely to the path of the sheet or continuous web, in use.

2. The hot-stamping press according to claim 1, further comprising a cooling unit located downstream of the foil application unit to cool down the foil material and the adhesive subsequent to the application of the foil material onto the sheet or continuous web,
wherein the UV-curing unit is provided downstream of the cooling unit.

3. The hot-stamping press according to claim 1, wherein the UV-curing unit is located immediately after the foil application unit.

4. The hot-stamping press according to claim 1, wherein the UV-curing unit is a UV-LED curing unit.

5. The hot-stamping press according to claim 4, wherein the foil feeding system is adapted to supply the foil carrier at a plurality of transverse positions transversely to the path of the sheet or continuous web and wherein the UV-LED curing unit comprises a transverse bar extending transversely to the path of the sheet or continuous web, which transverse bar includes a plurality of individually-addressable LED elements or individually-addressable clusters of LED elements, which LED elements or clusters of LED elements are activated in dependence of the transverse positions along which the foil material is applied onto the sheet or continuous web.

6. The hot-stamping press according to claim 1, wherein each UV-curing head is designed to focus ultraviolet radiation along a longitudinal section of the path of the foil material past the UV-curing unit.

7. The hot-stamping press according to claim 1, wherein the UV-curing unit is located along a curved portion of the path of the sheet or continuous web.

8. The hot-stamping press according to claim 7, wherein the UV-curing unit is designed to cooperate with a cylinder or roller supporting the sheet or continuous web past the UV-curing unit.

9. The hot-stamping press according to claim 1, wherein the UV-curing unit is located along a substantially flat portion of the path of the sheet or continuous web.

10. The hot-stamping press according to claim 9, wherein the UV-curing unit is designed to cooperate with a flat surface supporting the sheet or continuous web past the UV-curing unit.

11. A process of transferring or laminating foil material onto the sheet or continuous web by way of the hot stamping press of claim 1, the process comprising the steps of:
- providing the adhesive on the foil material in a manner that allows the sheet or continuous web to come into contact with the adhesive upon the foil material being applied to the sheet or continuous web, the adhesive ensuring adhesion of the foil material onto the sheet or continuous web, the adhesive comprising a combination of hot-melt compounds reacting to the application of heat and UV-curing compounds reacting to the application of ultraviolet radiation;
- transferring or laminating the foil material by hot-stamping onto the sheet or continuous web, the hot-stamping operation involving subjecting the hot-melt compounds of the adhesive to heat;
- subsequently subjecting the foil material transferred or laminated onto the sheet or continuous web to the UV-curing operation, the UV-curing operation involving subjecting the UV-curing compounds of the adhesive to ultraviolet radiation; and
- separating at least part of the foil carrier from the sheet or continuous web after the hot-stamping operation,
- wherein the UV-curing operation is carried out before separating the at least part of the foil carrier from the sheet or continuous web.

12. The process according to claim 11, further comprising the step of cooling down the foil material and the adhesive after the hot-stamping operation, wherein the UV-curing operation is carried out after cooling down the foil material and the adhesive.

* * * * *